Aug. 30, 1966

R. W. BUSHMEYER ET AL 3,269,098
METHOD OF FORMING PELLETS FROM HAY AND
LIKE FIBROUS MATERIALS

Original Filed March 27, 1961

INVENTORS
RICHARD W. BUSHMEYER
CHARLES D. MILLER
ROBERT E. STROHMAN

Emerson B Donnell
ATTORNEY

Aug. 30, 1966 R. W. BUSHMEYER ET AL 3,269,098
METHOD OF FORMING PELLETS FROM HAY AND
LIKE FIBROUS MATERIALS
Original Filed March 27, 1961

INVENTORS
RICHARD W. BUSHMEYER
CHARLES D. MILLER
ROBERT E. STROHMAN

Emerson B Donnell
ATTORNEY

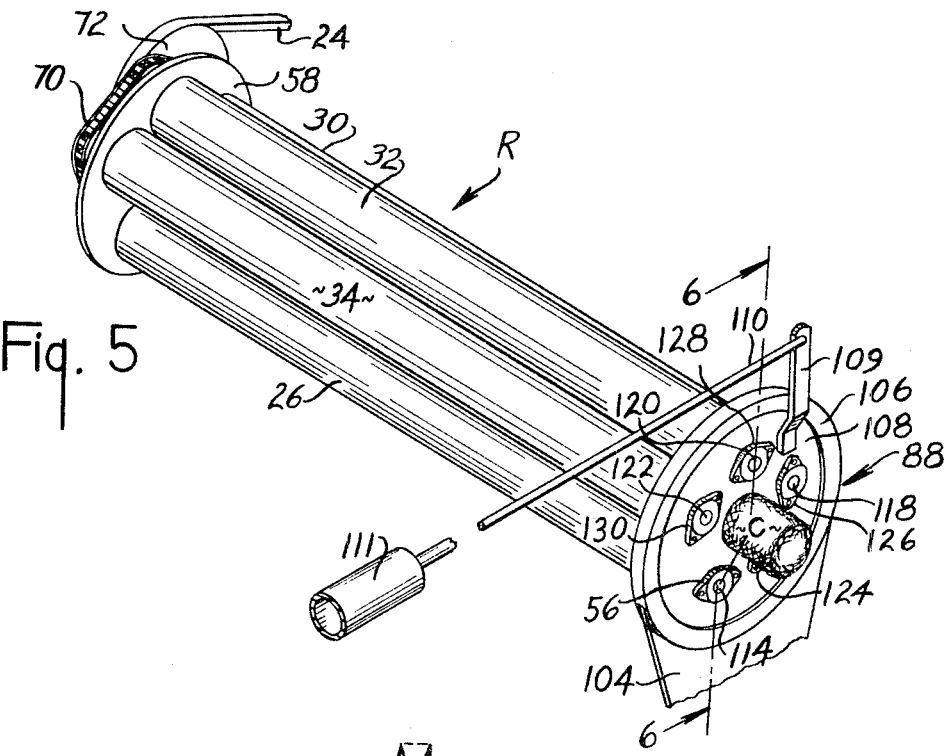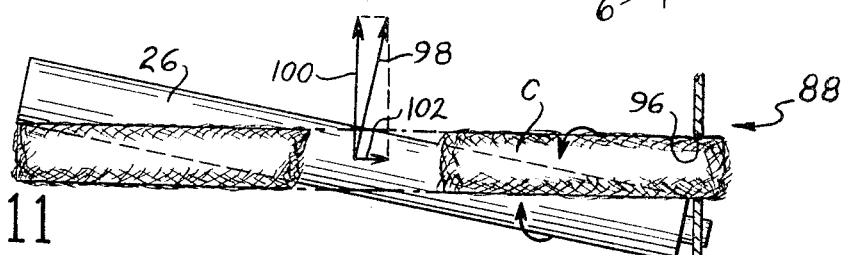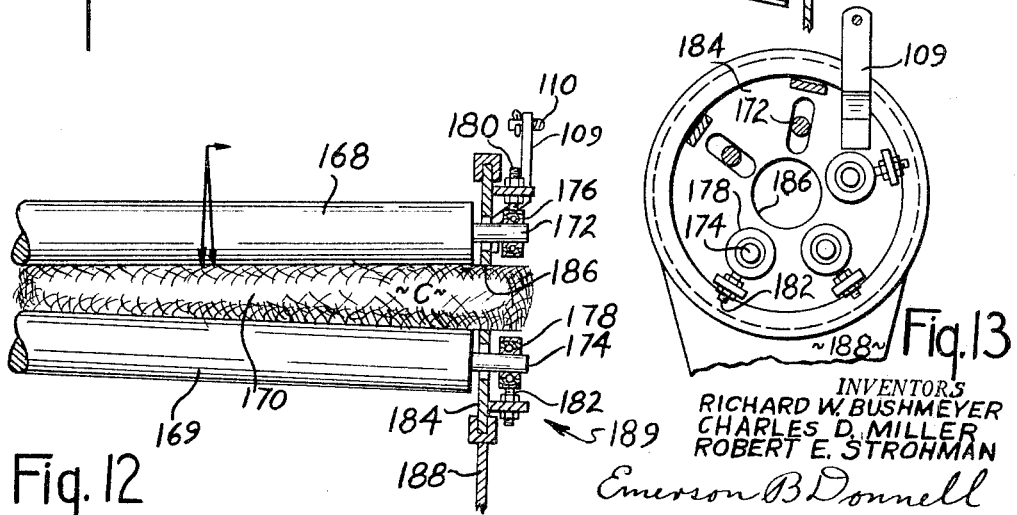

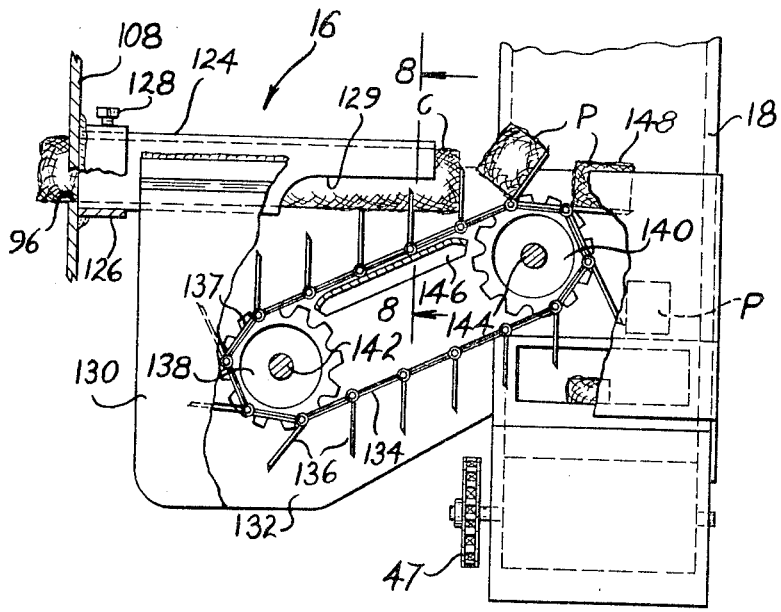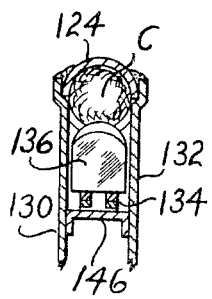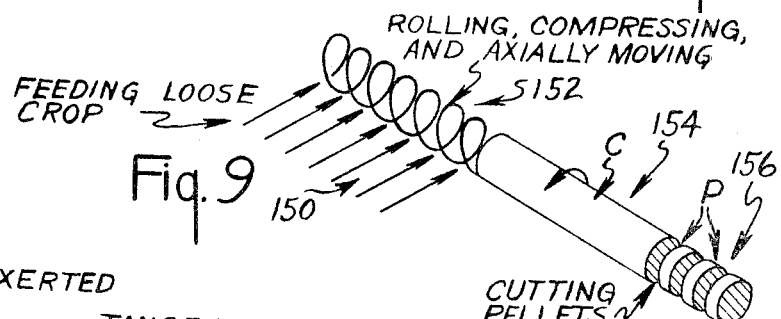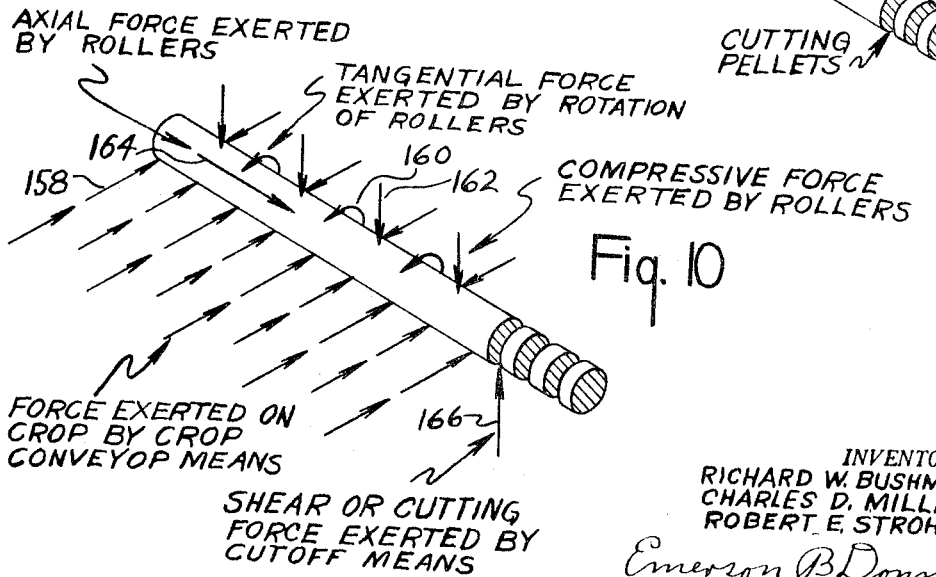

United States Patent Office 3,269,098
Patented August 30, 1966

3,269,098
METHOD OF FORMING PELLETS FROM HAY AND LIKE FIBROUS MATERIALS
Richard W. Bushmeyer, Rockford, Ill., Charles D. Miller, deceased, late of Rockford, Ill., by John T. Holmstrom, Jr., special administrator, Rockford, Ill., and Robert E. Strohman, Lansing, Mich., assignors to J. I. Case Company, Racine, Wis., a corporation of Wisconsin
Continuation of application Ser. No. 98,592, Mar. 27, 1961. This application Nov. 12, 1963, Ser. No. 323,166
16 Claims. (Cl. 56—1)

This application is a continuation of Bushmeyer et al. application Serial No. 98,592, filed March 27, 1961, now abandoned.

This invention relates to a crop pelleting machine, and particularly, to a machine for the picking up and forming of forage, plant vines and stems, crop residue, and other material into compressed form, and cutting it into pellets, wafers or other desirable shapes.

The conventional way of preserving hay or other forage crops for storage and eventual feeding to animals is to bale it, the bales so formed often weighing in excess of 50 pounds and being retained in their compressed state by wire or twine, and these bales must then be separated in some manner before the compressed material is fed to cows or other farm animals. The possibility of packing and storing crops of this type in this manner is largely dependent on the moisture content of the crop and existing weather conditions, which factors limit the time during which baling can be accomplished. It can be appreciated that the formation of hay or other forage crops into relatively small compact pellets or wafers, rather than into large bales will substantially reduce the handling, feeding, and storage problems encountered when working with such material, since, for example, such pellets, as is well known, are cohesive, self-supporting and stable, need no wire, twine or binding of any kind, so that they can be conveniently handled mechanically during both the storage and feeding operations. Furthermore, it would be most desirable if the crops could be harvested and processed in the field without requiring the farmer to wait until the cut product reached a certain degree of dryness.

Accordingly, it is an object of the invention to provide an improved pelleter of the type employing a roller-compressor mechanism which will develop a positive force to expel the materal compressed by the rollers.

Further objects and advantages will become apparent from the following description taken in connection with the accompanying drawings in which:

FIG. 5 is a perspective view of the roller-compressor unit with parts broken away taken from the left side above and to the front and illustrating the means for adjusting the rollers;

FIG. 7 is a side view of the cutoff mechanism taken from the front of the machine along the line 7—7 of FIG. 1, and with parts broken away;

FIG. 8 is a vertical sectional view on the line 8—8 of FIG. 7 illustrating the slicing action of the cutoff mechanism;

FIG. 9 is a perspective diagrammatic view illustrating the forming of the pellets;

FIG. 10 is a perspective diagrammatic view indicating the forces acting on the material during the pellet making operation;

FIG. 11 is a diagram illustrating the development of the axial force component characteristic of the invention;

FIG. 12 is a view similar to FIG. 6 showing a modification;

FIG. 13 is an end view, with parts removed, of the structure shown in FIG. 12.

Generally stated, the invention is practiced by providing a pickup and conveyor means for directing crops from the field into a roller-compressor mechanism, where the crop is formed into a densely compressed roll or core, the rollers being angled or skewed in relation to the core being formed so that the core is promptly expelled from the roller-compressor unit to a cutting mechanism which slices the core into desirably sized pellets or wafers.

Figure 1:
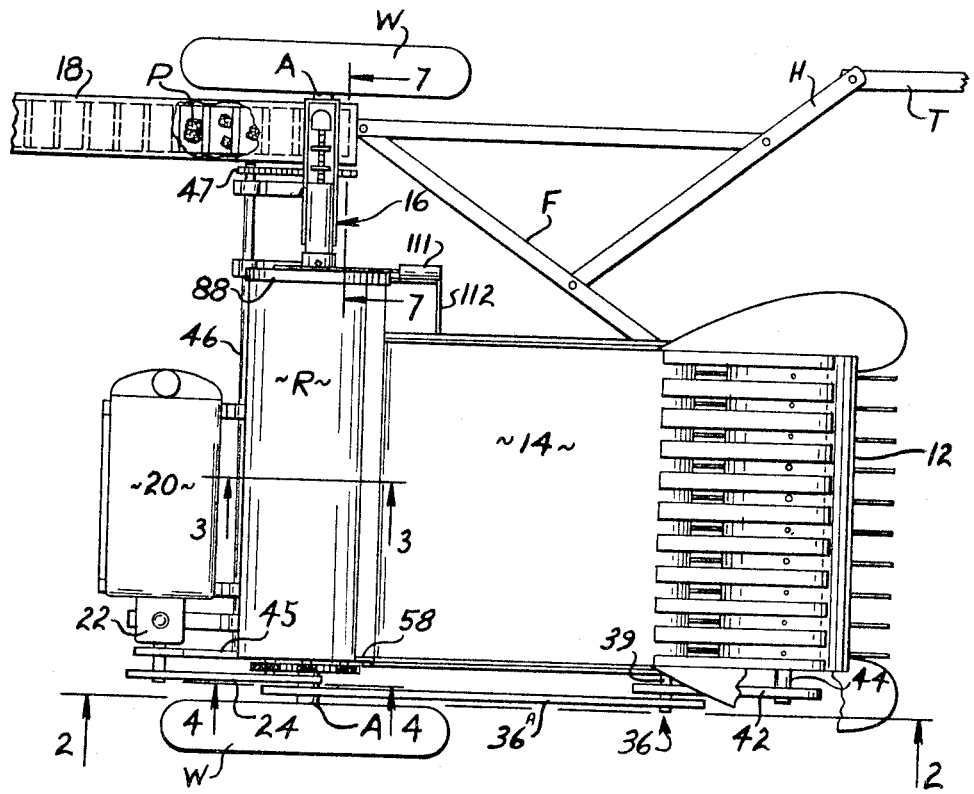
FIG. 1 is a plan view of a field type pellet forming machine.

Referring to FIG. 1, there is illustrated in plan view a field crop pelleter comprising a frame structure F, which is supported by wheels W mounted on axle A. The pelleting machine can be drawn by a prime mover such as a tractor T through a drawbar or hitch mechanism H. The pelleter consists of a pickup means 12 of suitable or well-known type which picks up the crop from the ground and directs it to a conveyor 14, which in turn feeds the material to a roller-compressor unit R. The roller-compressor unit operates to compress the material into a generally cylindrical core C which is propelled outwardly through the end of the roller-compressor unit where it is cut off by a cutting mechanism 16, and deposited on an elevator 18 which conveys the resulting pellets P to a wagon, or other point of disposition.

Figure 2:
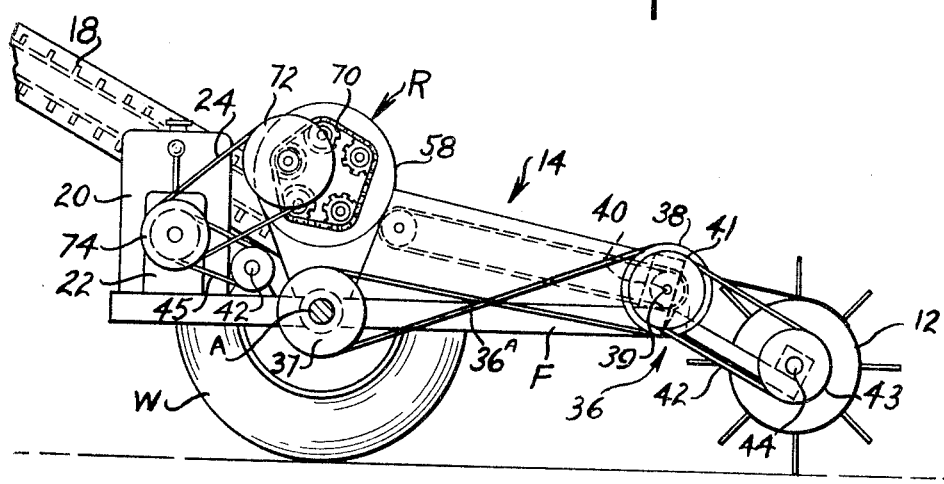
FIG. 2 is a longitudinal sectional view taken along the line 2—2 of FIG. 1.
Figure 3:
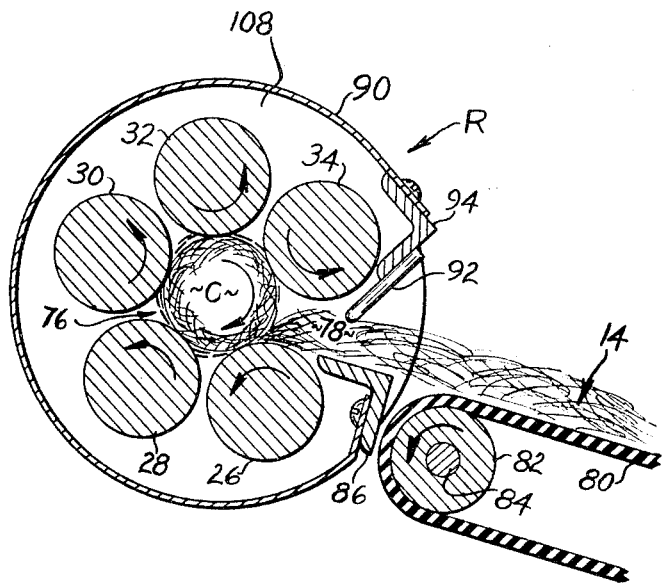
FIG. 3 is a longitudinal section of a portion of the machine taken along the line 3—3 of FIG. 1.
Figure 4:
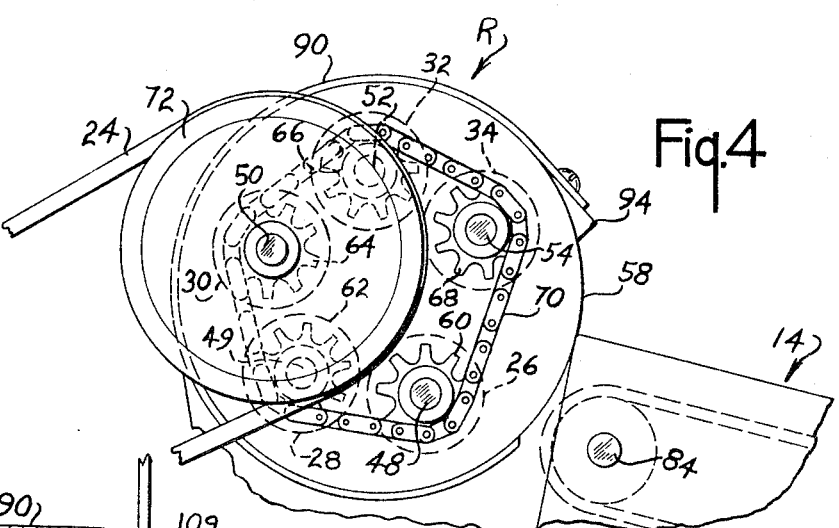
FIG. 4 is a longitudinal sectional view showing the roller drive mechanism in elevation and taken along the line 4—4 of FIG. 1.

In the arrangement shown in FIG. 1, an internal combustion engine 20 is mounted on frame F and drives through suitable gearing mechanism 22 and a belt drive 24, the roller-compressor means R comprising, in the present instance, rollers 26, 28, 30, 32, and 34, more particularly shown in FIG. 3. The details of this drive mechanism are shown more clearly in FIGS. 2 and 4, and will be described in greater detail hereinafter. The pickup 12 is operated through a belt drive, generally designated as 36, driven from one of the ground wheels W so as to synchronize the pickup speed with the rate of movement of the machine over the ground, belt drive 36 also driving conveyor 14. Belt drive 36 comprises a belt 36ᵃ driven by a pulley 37 fixed in relation to wheel W, and which drives a pulley 38 on a shaft 39, journaled in frame F and a roller 40 constituting the driving roller of conveyor 14. Shaft 39 also has a pulley 41 which drives, through a belt 42, a pulley 43 fixed on a driving shaft 44 of pickup 12. Elevator 18 is driven from gear box 22 by a belt drive 45, a cross shaft 46, and a chain-and-sprocket drive 47.

FIG. 2 shows the drive mechanism for the roller-compressor unit R and the conveyor 14. Returning to a more complete description of roller-compressor R, as more particularly seen in FIG. 4, roller 26 has a gudgeon or short shaft 48 and similarly rollers 28, 30, 32, and 34 have shafts 49, 50, 52, and 54 respectively, all journaled in suitable bearings, as 56, FIG. 5. The bearings 56 are supported by a plate structure or end support, generally designated as 58, which support 58 serves to space the several shafts and rollers and support them in the desired positions. Shaft 48 has fixed thereon a sprocket 60 and similarly shafts 49, 50, 52, and 54, have sprockets 62, 64, 66, and 68 respectively, fixed thereon, and a chain 70 is trained around and meshed with all of the sprockets so that rotation of shaft 50, for example, will cause translation of the chain and rotation of shafts 52, 54, 48, and 49, as well.

Belt 24 engages a pulley 72, also fixed on shaft 50 so that engine 20 drives the roller-compressor unit through gearing mechanism 22, pulley 74, belt 24, and above-mentioned pulley 72. In the present instance, the sprockets 60, 62, 64, 66, and 68 are identical and the rollers 26, 28, 30, 32 and 34 are also identical so that, with the arrangement disclosed, the rollers are driven in the same direction, and at the same speed or number of revolutions per minute, and therefore, have the same tangential velocity at their surfaces.

Furthermore, the rollers are also preferably of uniform diameter along their lengths so that each roller has the same tangential speed along its entire length of material handling surface.

FIG. 3 illustrates the disposition of the rollers in a generally cylindrical circumferential arrangement, except as further described, with only necessary mechanical clearance suitable to mechanisms of this class, to define a core-forming chamber 76 in which a body of crop material would be rotated by the movement of the portions of the surfaces of the rollers presented at any instant to the core-forming chamber 76. By this action the crop material is compressed into a dense cylindrical core. The rollers 34 and 26 adjacent the conveyor 14 are spaced apart circumferentially of chamber 76, farther than the rest so as to form a throat or entrance passageway 78 through which material may be fed between the rollers into chamber 76. A variety of conveying means is contemplated to feed material to throat 78, such as the above-mentioned conveyor 14 comprising a belt portion 80 running about a roller 82, carried on a shaft 84, suitably journaled in frame F. As will be apparent, conveyor 14 deposits the crop material on, or propels it over a transverse frame member 86, carried by above-mentioned end plate or support 58, and a support assembly generally designated as 88. Transverse member 86 aligns the material relative to throat 78.

Rollers 26, 28, 30, 32, and 34 are covered or enclosed by a safety shield or housing 90, mounted on transverse frame member 86, and are supported between end plate 58 and support assembly 88, in suitable bearings supported on these members. To prevent any of the material from being deflected out of the chamber 76 by reason of the motion of roller 34, which, it will be observed is opposed to the movement of crop material into throat 78, and to further ensure alignment of the material therein, a plurality of downwardly projecting fingers 92 are secured to a transverse frame member 94. The frame member 94 is supported by end plate 58 and assembly 88. Fingers 92 serve to keep material traveling into throat 78 away from the portion of the surface of roller 34, which is moving in a direction generally opposite to that of the material coming from conveyor belt 80. Such motion of the roller 34 otherwise might interfere with effective feeding if roller 34 were not shielded in some manner. It is desired that the rollers have substantially the same tangential speed along their length so that they rotate core C at a given rate without the occurrence of any substantial slippage between the core and the individual rollers, and in the instant case this is accomplished by having identical rollers rotated at the same number of revolutions per minute as previously explained. However, it is within the scope of this invention to have rollers of different diameter rotated at different speeds, provided only that the rollers all be rotated in the same direction.

The roller mechanism disclosed in FIG. 3 illustrates the manner in which the hay or other material introduced into chamber 76 is contacted by the moving roller surfaces to form a dense core.

It is to be noted that the material operated upon, such as hay, straw, alfalfa and the like, is usually in the form of relatively long stems, ranging anywhere from a few inches to several feet, and that such material, when fed as a mat-like mass or ribbon into the space within a cluster of rollers, all turning in the same direction, as indicated, is readily intertwined and rolled into a rope-like mass or core having a high density, as compared with the original mat. Furthermore, any leaves which may have been loosened from material such as alfalfa are caught among the entwining stems and encased in the rope-like core.

Since all of the rollers run in the same direction, it will be apparent that the adjacent surfaces of adjacent rollers move in opposite directions, and that therefore, there must be clearance between one roller and the next, but in view of the intertwining nature of the material, there is little, if any, tendency for any appreciable quantity of it to escape from the core forming chamber through such clearances, and furthermore, by reason of the opposite movement of the adjacent surfaces, the tendency of one surface to carry material out of the core chamber is substantially neutralized by the equal tendency of the adjacent surface to carry material into the core chamber.

With continuous introduction of material into chamber 76, the density of core C will continuously increase resulting in forces being imposed on the rollers. A reactive force by the rollers is developed in a manner hereinafter described which will tend to move the core out of chamber 76 through an opening 96 in the plate assembly 88 through which core C is directed. Assembly 88 may conveniently, therefore, be designated as the exit support for rollers 26, 28, 30, 32, and 34.

The necessary axially directed force is developed primarily by utilizing a component of the force developed by the action of the rollers, as a result of skewing the rollers a small amount on the order of one to four degrees, relative to core C.

Because the rollers are skewed with respect to the hay bar or core, the rollers set up a peripheral force on the core which tends to move the core out of the core chamber 76. This peripheral motion of the rollers can be divided into two portions, one of which imparts rotation to the hay core, and one of which imparts longitudinal movement of the core out of the chamber 76 through end support assembly 88.

This relation might also be described as follows: Referring to FIG. 11, which is a diagram in which the angles involved are exaggerated, it will be observed that core C is rotating in a counterclockwise direction as viewed from the right end, while roller 26 is rotating in a clockwise direction. It will also be observed that the end of roller 26 adjacent plate assembly 88 is offset downwardly in relation to the adjacent end of core C, as seen in FIG. 11. In other words, the roller is skewed, as it would be if plate assembly 88 were to be rotated about the axis of core C in the same direction as that of the rotation of roller 26. It is to be noted that this discussion directed to roller 26 is representative of all of the rollers. Considering now the actual direction of movement of any part of the surface of roller 26 in contact with core C, such movement would, of course, be in the direction of arrow 98 or at right angles to the axis of roller 26. With true rolling contact between roller 26 and core C, the reactive forces on core C by the roller 26 would take the direction of arrow 98 which direction can be broken into two components. These components cause a rolling movement indicated by arrow 100 and an axial translational movement as indicated by arrow 102. Thus a positive axial displacing force would be exerted on core C which would cause it to progress through the chamber 76 between the several rollers and out of the roller-compressor unit through above-mentioned opening 96.

In a word, the axes of the rollers are in non-parallel relation to the axis of the core forming chamber.

In addition to the above forces acting on the core C there are also forces set up between the rollers and core resulting from the build-up of the core density in the core chamber. This relationship results in reaction forces being exerted by the skewed rollers acting on the core which while normal to the axes of the rollers, are not normal to the core and thus result in an axial component tending to move the core longitudinally.

As will be apparent to those skilled in the art, when the rollers are skewed as described, they will be brought closer together at their mid portions than at their ends, the resulting chamber being in the general form of a hyperboloid. In other words, it will be larger, or flared at both ends. Thus the material between the rollers as a result of its outward pressure and the inward reaction of the rollers receives an angular inward pressure from the rollers which has a component acting axially of the chamber. This axial force, however, will be divided at the mid portion of the rollers, the material tending to move out at both ends of the chamber. However, if the rollers are spaced farther from each other at the exit end, while still skewed, the spacing can be made so that the closest spacing will be at the opposite end, with the axial force referred to then being toward the exit end throughout the major portion of the core to assist in moving the core out of the core chamber.

Figure 6:
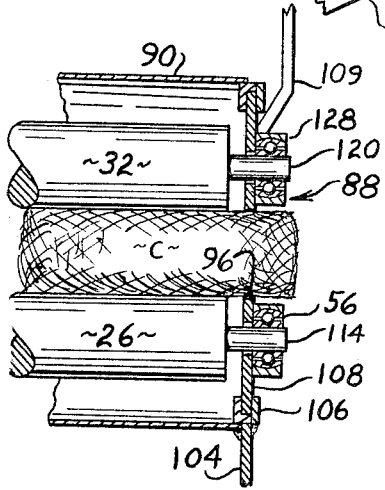
FIG. 6 is a partial sectional view taken on the line 6—6 of FIG. 5.

Different materials being treated by the roller-compressor might require different degrees or amounts of rolling and compressing so as to make it desirable that they would pass through the device at different rates of speed and this condition may be readily accommodated, as illustrated in FIGS. 5 and 6. Above-mentioned exit support assembly 88 is made up of a bracket portion 104 which has a circular channel portion 106 in which is rotatably engaged a bearing plate 108 having an arm 109 to which is pivotally connected to a control rod 110. Rod 110 is controlled and retained by any suitable or well-known control mechanism, such as a servo cylinder 111 supported at 112 on frame F. As will be apparent, pushing or pulling on rod 112 will rock bearing plate 108 within channel portion 106.

Rollers 26, 28, 30, 32, and 34 have, at their ends opposite the drive ends, stub shafts 114, 116, 118, 120 and 122 which are carried in bearings 56, 124, 126, 128, and 130, that are secured to plate 108. Thus, plate 108 serves to support and space the rollers at the ends thereof, adjacent exit opening 96. As will be apparent, rotating plate 108 in channel portion 106 will twist the group of rollers about the axis of chamber 76 or core C, or, in other words, will show each roller in relation to chamber 76. Such skewing would, of course, misalign shaft 116 and all the other shafts in relation to their respective bearings, and for this reason, bearing 124, as well as all the others associated with the several rollers, is made of the self-aligning type, as well known and illustrated in FIG. 6. Thus it is possible to introduce more or less skewing and to increase or decrease the axial component of force or motion exerted on core C, to satisfy the condition of the crop or other material being treated.

It is also contemplated that a fixed degree of skewing of the rollers may be determined, and that the machine may be permanently set up or built with such a fixed skewing of the rollers, in which case plate 108 would, of course, not be movable, and arm 109, rod 110, and cylinder 111 would be omitted.

FIGS. 7 and 8 illustrate the cutting mechanism 16 which severs the core C into pellets P, and which drops them directly into elevator 18, by which they are transferred to a wagon or other receptacle or point of disposition. Core C, as it extends out of opening 96, is retained against deflection during the cutting operation by a tubular member 124 which is fixed to end plate 108 in any suitable manner, as by a collar 126, and set screw 128. A portion of tubular member 124 is cut away at 129 in a manner hereinafter described. Side sheets 130 and 132 are secured to member 124 to support the cut off mechanism and to form a chamber in which it may work. The actual cutting mechanism, which is actuated by the axial movement of core C, includes an inclined endless chain 134 on which is mounted a plurality of cutting blades 136. Chain 134 is trained about sprockets 138 and 140 which are rotatably mounted on shafts 142 and 144 which are rotatably supported, in the present instance, in side sheets 130 and 132. Chain 134 is braced by a support 146 secured between side sheets 130 and 132 against the very considerable reaction (downward in FIG. 7) against knives 136, as will appear.

Furthermore, each of the knives 136 is guided in a manner to remain substantially normal to core C while in contact therewith, and is preferably rigid with one of the individual links 137, whereby to give it stability in an upwardly directed position at such times as links 137 are supported by brace 146.

As core C is expelled from chamber 76, it is rotating and also traveling lengthwise through tubular member 124 and it contacts one of the blades 136 which blade is carried along by the axial movement of the core so as to cause chain 134 to travel around sprockets 138 and 140. As a result of the angular relationship of the chain relative to the core, the blade will move upwardly through cutaway portion 129 and gradually slice through the core at the time it is carried along by the core so as to cut off a slice or pellet 148 which will then be disposed between two adjacent knives. The movement of chain 134 causes subsequent blades to come into contact with the core in a spaced relationship, and to start slicing additional pellets as the core continues to be expelled. The size of the pellets is readily predetermined by the choice of spacing of the blades. As the chain links 137 pass about sprocket 140, the blades will swing away from each other so as to release the pellets from between them to fall into the elevator 18, the space between plates 130 and 132 being open to the upper side of elevator 18.

FIG. 9 is a diagrammatic representation of the action of the material in the machine, it being introduced at 150, rolled at 152, and as more material is introduced, compacted at 154. The material is then sliced into pellets at 156.

FIG. 10 represents diagrammatically the forces acting upon the material, the arrows 158 representing the inward thrust of the conveyor 14, the arrows 160 representing the circumferential movement imparted by the motion of the rollers, the arrows 162, representing the inward pressure developed by the rollers tending to compact the core and the arrow 164 representing the axial component of force or motion induced by the angular or skewed position of the rollers, as related to the core. The cutting force is represented by the arrow 166, and which completes the series of forces acting on the material.

FIG. 12 shows a modification in which a series of rollers as 168 and 169 are supported about a core forming chamber 170, the axes of the rollers being supported in a diverging relation to each other so that the resulting core forming chamber has a flaring configuration directed toward the exit end of the assemblage. The rollers are not skewed in relation to the chamber, and, as material is accumulated in chamber 170, an outward pressure is developed against the inner surfaces of rollers 168 and 169, and, since the rollers are in diverging relation as stated, the resulting inward force or reaction has a component directed axially of the chamber 170, and which propels the resulting core out of the chamber to be sliced into pellets as hereinbefore described.

The amount of flaring is adjustable in the present instance, rollers 168 and 169 having stub shafts 172 and 174 carried in self-aligning bearings 176 and 178 supported on screw threaded shanks 180 and 182 adjustably supported from an end plate 184, the latter providing an exit opening 186 through which the core formed in chamber 170 emerges.

End plate 184, within the contemplation of the invention may be rotatably mounted on a bracket 188 in the manner of above-mentioned plate 108, forming an end support generally designated as 189, and it may be adjusted so that the axes of the rollers 168 and 169 lie in planes containing the axis of core forming chamber 170, or so that the rollers are skewed in relation to the chamber as in the previously described embodiments. By reason of the resulting positions of the rollers when they are skewed, the core of material being formed in chamber 170 receives an axial force tending to propel it from the chamber, as a component of the angular inward pressure of the rollers, and an additional axial force as a component of the tangential force developed by rotation of the rollers in the skewed positions.

When the rollers are not skewed, the core is propelled entirely by the axial component of the angular inward pressure of the rollers.

The operation of the device is thought to be clear from the foregoing description, but in summary, it might be said that the machine, as seen in FIG. 1, proceeds along the field picking up the harvested crop material which is placed by pickup 12 on conveyor 14. Conveyor 14, as seen best in FIG. 3, directs the material between two of the rotating, compacting rollers which, in conjunction with the other rollers, forms the material into a hard, substantially cylindrical core. The rollers, by reason of their angular or skewed position, then roll the core out of the roller-compressor unit imparting a relatively rapid rotation thereto as well as an axial movement. The rotating core than engages the knives of the cutoff unit 16 which are carried along by the axial movement of the core, and which slice into the rotating mass so as to cut off pieces or slices in the form of the desired pellets, the latter being dropped onto the elevator 18 which transports them to the wagon or other point of disposition.

In the case of the FIG. 12 embodiment, the flared disposition of the rollers, by reason of the outward pressure of the material and inward reaction of the rollers, causes an axial force and as a result, axial movement of the core out of the chamber 170. This force is in addition to the force developed by the tangential movement of the rollers if they are skewed. When they are not skewed, the tangential force, of course, is not present and the core is propelled entirely by the angular inward pressure of the rollers.

It is to be understood that the embodiment disclosed is intended to be illustrative only, and that modifications will occur to those skilled in the art, and that the disclosure is not to be taken as limited except as defined in the annexed claims. For example, the conveyor 14 might be replaced by other conventional conveyors within the contemplation of the invention, the number of rollers might be varied, the feeds might be different, and other modifications will, no doubt, occur to those familiar with this type of apparatus. Also, angle member 86 could be eliminated and the conveyor 14 and roller 82 moved closer to the compressing rollers 26 and 34 to deposit the crop directly into the opening 78 of the roller compression chamber 76. It is, of course, intended to cover by the appended claims all such modifications as fall within the true spirit and scope of the invention.

What is claimed is:

1. In a process for forming pellets from hay and like fibrous material the steps of inserting the material into a core rolling chamber formed by a plurality of rollers turning in the same direction, rolling the material in said chamber by means of said rollers with the material contacting surface of several of the rollers imparting a combined circumferential and axial movement to said material while compacting the inserted material within said chamber into a dense self-supporting rotating substantially cylindrical core, said axial movement expelling said cylindrical core from said chamber; and cutting said core as it emerges, into a plurality of bodies of desired size.

2. In a process for forming pellets from hay and like fibrous material the steps of inserting the material into a core rolling chamber formed by a plurality of rollers turning in the same direction, rolling the material in said chamber by means of said rollers with the material contacting surface of several of the rollers imparting a combined circumferential and axial movement to said material while compacting the inserted material within said chamber into a dense cohesive rotating substantially cylindrical core, and axial movement expelling said cylindrical core from said chamber; and separating said core as it emerges, into a plurality of bodies of desired size.

3. In a process for forming pellets from hay and like fibrous material, the steps of picking up the material from the ground, conveying the material to a core rolling chamber formed by a plurality of rollers turning in the same direction, inserting the material into said core rolling chamber, rolling the material in said chamber by means of said rollers with the material contacting surface of several of the rollers imparting a combined circumferential and axial movement to said material while compacting said material within said chamber into a dense self-supporting rotating substantially cylindrical core, said axial movement expelling said cylindrical core from said chamber; and cutting said core as it emerges, into a plurality of bodies of desired size.

4. In a process for forming pellets from hay and like fibrous material the steps of inserting the material into a core rolling chamber formed by a plurality of rollers turning in the same direction, rolling the material in said chamber by means of said rollers with the material contacting surface of several of the rollers imparting a combined circumferential and axial movement to said material while compacting the inserted material within said chamber into a dense stable rotating substantially cylindrical core, said axial movement expelling said cylindrical core from said chamber; and pressing a knife against said rotating core outwardly of said chamber at intervals whereby the rotation of said core will cause sections of said core to be cut off to form the desired pellets.

5. In a process for forming pellets from hay and like fibrous material, the steps of inserting the material into a core rolling chamber formed by a plurality of rollers turning in the same direction in a direction radially of said chamber, rolling the material in said chamber by means of said rollers with the material contacting surface of several of the rollers imparting a combined circumferential and axial movement to said material while compacting the inserted material within said chamber into a dense cohesive rotating substantially cylindrical core, said axial movement expelling said cylindrical core from said chamber; and separating said core as it emerges, into a plurality of bodies of desired size.

6. In a process for forming pellets from hay and like fibrous material the steps of inserting the material into a core rolling chamber formed by a plurality of rollers turning in the same direction, exerting combined radial and axial pressure thereon, rolling the inserted material within said chamber by means of said rollers with the material contacting surface of several of the rollers imparting a combined circumferential and axial movement to the material to form a dense self-supporting rotating substantially cylindrical core, said axial pressure and combined circumferential and axial rolling acting to expel said cylindrical core from said chamber and to impart circumferential movement to said core, said movement being uniform in velocity throughout the length of said chamber; and pressing a knife against said rotating core outwardly of said chamber at intervals whereby the rotation of said core will cause sections of said core to be cut off to form the desired pellets.

7. In a process for forming pellets from fibrous material the steps of inserting the material into a core rolling chamber formed by a plurality of rollers turning in the same direction, rolling the material in said chamber by means of said rollers with the material contacting surface of several of the rollers imparting a combined circumferential and axial movement to said material while compacting the inserted material within said chamber into a dense self-supporting core, said axial movement expelling said core from said chamber; and cutting said core as it emerges, into a plurality of bodies of desired size.

8. In a process for forming pellets from fibrous material the steps of aligning the material, inserting it into a core rolling chamber formed by a plurality of rollers turning in the same direction, rolling the material in said chamber by means of said rollers with the material contacting surface of several of the rollers imparting a combined circumferential and axial movement to said material while compacting the inserted material within said chamber into a dense self-supporting substantially cylindrical core, said axial movement expelling said cylindrical core from said chamber; and cutting said core as it emerges, into a plurality of bodies of desired size.

9. In a process for forming pellets from fibrous material the steps of inserting the material a core rolling chamber formed by a plurality of rollers turning in the same direction through an opening bounded by certain of the rollers forming said chamber, shielding one of said rollers from contact with said material as it enters said rolling chamber, rolling the material in said chamber by means of said rollers with the material contacting surface of several of the rollers imparting a combined circumferential and axial movement to said material while compacting the inserted material within said chamber into a dense self-supporting substantially cylindrical core, said axial movement expelling said cylindrical core from said chamber; and cutting said core as it emerges, into a plurality of bodies of desired size.

10. In a process for forming pellets from fibrous material the steps of inserting the material into a core rolling chamber formed by a plurality of rollers turning in the same direction through an opening bounded by certain of the rollers, rolling the material in said chamber by means of said rollers with the material contacting surface of several of the rollers imparting a circumferential and axial movement to said material while intertwining and compacting the inserted material within said chamber into a dense self-supporting substantially cylindrical core, said axial movement expelling said cylindrical core from said chamber; and cutting said core as it emerges, into a plurality of bodies of desired size.

11. In a process for forming pellets from hay and like fibrous material of the type having leaves which may become loose from their stems, the steps of catching such loose leaves among the fibers of the material, inserting the material into a core rolling chamber formed by a plurality of rollers turning in the same direction through an opening bounded by certain of the rollers, rolling the material in said chamber by means of said rollers with the material contacting surface of several of the rollers imparting a combined circumferential and axial movement to said material while encasing said leaves in the inserted material and compacting said material within said chamber into a dense self-supporting substantially cylindrical core, said axial movement expelling said cylindrical core from said chamber; and cutting said core as it emerges, into a plurality of bodies of desired size.

12. A method of rolling fibrous material into a compact cohesive rope-like body, comprising introducing the material into the space within a cluster of rollers, rotating the rollers in a common direction and at a common peripheral speed, rolling the material within said space by means of said rollers with the material contacting surface of several of the rollers imparting a combined circumferential and axial movement to said material tending to move the material out of said space, and continuing the introducing of material into said space so that as said space becomes filled and said material is rotated, compacted and intertwined it is urged axially out of said space between the rollers of said cluster.

13. A method of forming fibrous material into compact cohesive pellets, comprising introducing the material into the space within a cluster of rollers, rotating the rollers in a common direction and at a common peripheral speed, rolling the material within said space by means of said rollers with the material contacting surface of several of the rollers imparting a combined circumferential and axial movement to said material tending to move the material out of said space, continuing the introducing of material into said space so that as said space becomes filled and said material is rotated, compacted, intertwined and formed into a rope-like body it is urged axially out of said space between the rollers of said cluster, and severing the rope-like body at intervals to form the desired pellets.

14. A method of forming fibrous material into compact cohesive pellets comprising introducing the material into the space within a cluster of rollers, rotating the rollers in a common direction and at a common peripheral speed, rolling the material within said space by means of said rollers with the material contacting surface of several of the rollers imparting a combined circumferential and axial movement to said material tending to move the material out of said space, continuing the introducing of material into said space so that as said space becomes filled and said material is rotated, compacted, intertwined and formed into an elongated core it is expelled axially from said space between the rollers of said cluster, and severing the elongated core at intervals to form the desired pellets.

15. A method of rolling fibrous material into a compact cohesive rope-like body, comprising introducing the material into the space within a cluster of rollers, rotating the rollers in a common direction and at a common peripheral speed, rolling the material within said space by means of said rollers with the material contacting surface of several of the rollers imparting a combined circumferential and axial movement to said material tending to move the material out of said space, and continuing the introducing of material into said space so that said space becomes filled and said material is rotated, wound on itself, compacted and intertwined and urged axially out of said space between said rollers.

16. A method of rolling fibrous material into a compact cohesive rope-like body, comprising introducing the material into the space within a cluster of rollers, rotating the rollers in a common direction and at a common peripheral speed, rolling the material within said space by means of said rollers with the material contacting surface of several of the rollers imparting a combined circumferential and axial movement to said material tending to move the material out of said space, and continuing the introducing of material into said space to fill said space and rotate, compact, intertwine and urge said material axially out of said space between said rollers.

References Cited by the Examiner

UNITED STATES PATENTS

| | | | |
|---|---|---|---|
| 378,570 | 2/1888 | Brady et al. | 100—89 |
| 963,775 | 7/1910 | Killman | 100—78 |
| 963,823 | 7/1910 | Spoon | 100—82 |
| 2,893,308 | 7/1959 | Bodisch | 100—86 X |

LOUIS O. MAASSEL, *Primary Examiner.*

WALTER A. SCHEEL, *Examiner.*